July 28, 1931.  G. C. THOMAS, JR  1,816,664
CABLE CONNECTER
Filed Sept. 11, 1925
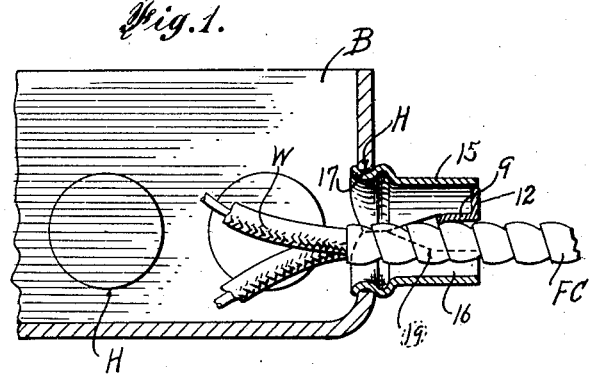
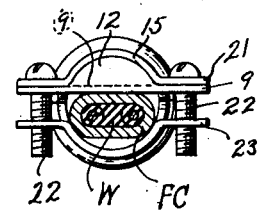
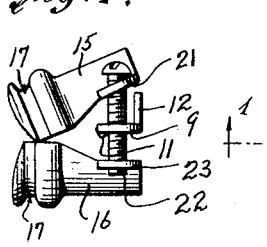
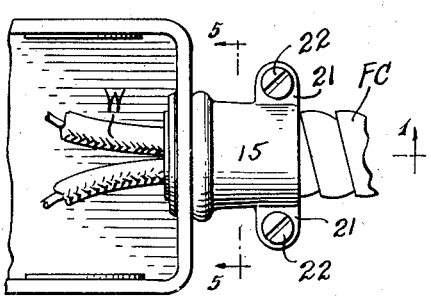
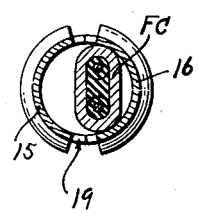
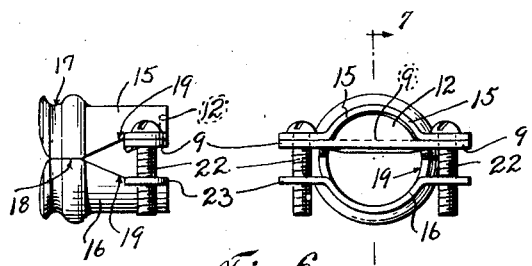
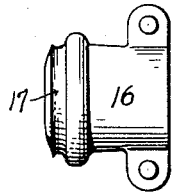
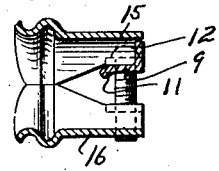
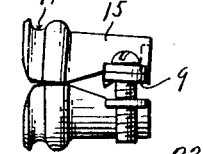
INVENTOR
George C. Thomas, Jr.
BY Bohleber & Ledbetter
ATTORNEYS Patented July 28, 1931

1,816,664

UNITED STATES PATENT OFFICE

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY

CABLE CONNECTER

Application filed September 11, 1925. Serial No. 55,664.

This invention relates to cable connecters and more particularly to adapter cable connecters by which cable of one or another size or shape may be attached to an electrical fixture box by employing substantially the same connecter for several types of cable.

Primarily it is an object of this invention to produce an adapter attachment for cable connecters by which any well-known suitable type cable connecter ordinarily used for one kind of cable may be converted for use with another kind of cable and particularly converted for use on flat type cable.

Furthermore, it is an object to produce an adapter cable connecter by which small size or more particularly flat armored cable may be attached to electrical fixture boxes having standard size round knock-out openings therein.

Also a purpose is to produce an improved combination split sleeve type adapting connecter by which the split sleeve itself may be used to attach round cable to an electrical fixture box and then by simply using the improved adapter bridge or bearing clamp plate therewith, the sleeve may be reduced inside thereof and used to attach flat type cable to a box.

Other objects of the invention will be further understood from the following description. The accompanying drawings illustrate a preferred form of the improved adapter cable connecter and changes may be made in the structure and mode of installation and use without departing from the principles involved.

Figure 1 shows a longitudinal sectional assembly view with a cable attached to a box by the connecter; and Figure 2 is a plan view thereof.

Figure 3 shows an outside end view of a cable secured in a connecter and with the box removed.

Figure 4 shows the connecter removed from the cable and from the box and opened up and made ready to have its box anchorage end inserted within a box hole.

Figure 5 shows a sectional view taken on the line 5—5 of Figure 2.

Figure 6 shows a cluster view of the connecter removed from the box and without the cable, there being shown a side elevation, end elevation, and bottom projection of the cable connecter.

Figure 7 is a longitudinal sectional view as taken on the line 7—7 of Figure 6.

Figure 8 is a perspective view of the adapter bearing clamp plate or adapter bridge by which an ordinary split type sleeve connecter customarily used on round cable is converted for use on flat cable.

Figure 9 is a view of the outer end of the split sleeve connecter contracted by which the other end, the connecter anchorage end, is expanded to anchor the sleeve within a box hole.

In electrical installation work, flat type cable FC carrying electrical transmission wires W is frequently used because it occupies less space and can better be concealed in walls, and this cable FC must necessarily be fastened in ordinary round knock-out standard size cable openings or box holes H in electrical fixture boxes B. Since the boxes B are made with round cable receiving holes H, it is an object of my invention as aforesaid and among other things, to produce an adapting connecter to attach the flat cable FC within round box holes, and also it is an object to produce an adapter bridge plate by which ordinary split type sleeve connecters primarily used for round cable may be converted for use with flat cable as illustrated in the drawings.

Referring to Figure 8, there is shown a separately constructed removable bearing clamp plate or adapter reducing bridge 9 with screw receiving holes 10 at each end. In some forms of the structure, one edge 11 may be turned down slightly to bite or press into the armored wall of the cable FC and the other edge is turned up to produce a space closing plate, flange or rib 12. The parallel edges 11 and 12 thus provide one down-turned edge and one up-turned edge on the narrow bridging plate 9 used as a bearing clamp plate to secure a flat cable within a cylindrical sleeve connecter as will be explained. The upturned edge 12 is rounded or arched to fit the inside cylindrical wall of the connecter member.

The foregoing adapter bridge or bearing clamp plate may be used or combined to great advantage with an ordinary split type sleeve connecter. For example, a split type sleeve connecter ordinarily comprises half-cylindrical parts or shells 15 and 16 having any suitable form of connecter anchorage means by which the sleeve is fixed within the box hole H. The anchorage means shown comprises a pressed groove 17 which embraces the rim H of the box hole. The anchorage end 17 of the sleeve is made with rest or bearing edges 18 on which one or the other sleeve section, as 15, rotates or slides relatively on the other as shown in Figure 4 in order that this end may contract and thus become smaller so it may be inserted in the box hole H.

The other ends of the sleeve sections are made with diverging or receding edges 19 in order that the sleeve end 17 may be expanded, as in Figure 9, which is accomplished by causing the section 15 to rock relatively on the bearing edge 18 thus bringing together the outer ends of the sleeve sections. The receding sleeve edges 19 cut away from the rocking or bearing edges 18 enable the outer end of the sleeve, i. e. the end opposite the grooved end 17, to be brought together thus expanding the connecter anchorage end 17.

Ears 21 are made on one section and provided with apertures therethrough for the free movement of clamp screws 22. Similarly, ears 23 are made on the other sleeve section and are threaded to receive the clamp screw 22 in order that the two screws 22 may control the opening and closing operation of the two sleeve half sections 15 and 16.

The adapter or reducing bearing clamp plate 9 heretofore explained is carried on the two clamp screws 22 independently of the inner surface of the sleeve 15—16 by passing the screws through the apertures 10 thereof which thus transversely disposes the plate 9 cross-wise within the sleeve connecter and disposes the flange or up-turned edge 12 upwardly into the connecter section 15 thereby closing or sealing the upper half of the sleeve connecter adjacent the cable FC when this type of cable used. Thus pressure is applied to the ends of the clamp plate 9 from the ears 21 and 23 and the screws.

Flat type cable FC is attached to ordinary electrical fixture outlet boxes B by loosening up on the clamp screws 22 thus reducing or contracting the box anchorage end of the connecter to that position shown in Figure 4 whereupon the connecter is inserted in the box hole and the adapter or reducing clamp plate 9 is lifted to its uppermost position whereupon the cable FC is inserted as shown in the assembly views. The clamp screws 22 are now tightened down which expands the sleeve groove 17 thereby positively anchoring the sleeve in the box hole H and simultaneously clamping down on the cable FC by bearing and pressing the clamp plate 9 and its edge 11 into the cable. The clamp plate down-turned edge 11 therefore bites or bears into the surface of the cable FC while the lower sleeve section 16 acts as a cradle against which the opposite edge of the cable is pressed and clamped thereagainst thus procuring a positive hold as between all three members, namely, the box, connecter and the cable. The upturned edge or flange 12 not only reinforces the adapter bridging clamp plate 9 to stiffen it against bending under screw pressure, but substantially closes the upper sleeve section 15 as observed from the end view Figure 3 thereby closing the space in the connecter above the flat or small size cable.

The reducing adapter clamp plate shown in Figure 8 may be removed from the cable sleeve connecter and thus the connecter is made ready for use with full size round cable in the usual way. It is therefore unnecessary to manufacture different types of connecters for round and flat cable and my improved adapter may simply be stamped from sheet metal and supplied with split sleeve connecters thereby enabling the connecters to be used with either flat or round cable depending upon the work at hand which reduces manufacturing cost and eliminates the necessity of carrying in stock two types of connecters.

The principle of my invention applies to sleeve connecters of all kinds, and while illustrated in connection with a split type connecter, it may as well be used to reduce the cable receiving space inside a sleeve connecter of any type so as to reduce a large cable sleeve to a small one or convert a round cable connecter to a flat or oval cable connecter.

What I claim is:

1. Cable connecting means comprising in combination, a box having round cable receiving holes, an adapting connecter disposed in the box hole and including means to secure either flat or round cable to the box, connecter anchorage means carried on the connecter by which it is fixed in the box hole, cable clamp means carried on the connecter by which a cable is secured to the box and connecter, adapter means carried by the connecter by which a flat cable is secured to the connecting means, said adapter being independent of the curved inner wall of the connecter, and said adapter including means cooperating with the clamp means to apply pressure to said flat cable.

2. In combination with a box having a connecter and cable receiving hole, a sleeve disposed in the hole and ordinarily adapted to receive round large size cable, anchorage means by which the sleeve is fixed in the box hole, clamp means by which the round cable is secured in the sleeve, an adapter disposed in the sleeve by which the sleeve is changed over to a small size cable connecter sleeve, said adapter including a reducing plate disposed inside the sleeve to bear on a small cable and force it to one side of the sleeve, said adapter being independent of the curved inner wall of the sleeve, and said adapter also including means cooperating with the aforesaid clamp means by which pressure is applied through the adapter to the small size cable.

3. In combination with a box having a round hole to receive a connecter and cable, a connecter mounted in the box hole, means anchoring said connecter in the hole, cable clamp screw means mounted on the connecter to secure a cable in the box hole and to the connecter, a reducing adapter cooperating with the clamp screw means by which small size flat wall cable received into the round box hole is forced to one side of the connecter thereby leaving an open space in the other side of the connecter, said adapter being independent of the curved inner wall of the connecter, and an upturned edge formed on the adapter projecting across and closing the open space in the connecter.

4. A cable connecter adapted to attach cable within a box hole comprising, a connecter member, anchorage means thereon provided to fix the connecter in the box hole, a clamp plate carried by the connecter, screw means mounted on the connecter engaging the clamp plate adapted to force a cable to one side of the connecter, said clamp plate being independent of the curved inner wall of the sleeve, and an upturned closure plate formed on the clamp plate and projecting transversely across the other side of the connecter to close the space therein left by the cable.

5. A cable connecter adapted to attach a flat cable within a round box hole comprising, a round sleeve, connecter anchorage means carried on the round sleeve to anchor it to a box, a bearing clamp plate mounted in the round sleeve, said plate including a flat side to bear against a cable, an upstanding member integral with the plate and projecting across the open space in the sleeve, said clamp plate being independent of the inner wall of the sleeve, and a screw mounted in the sleeve passing through the plate to apply pressure to a cable.

6. An adapting cable connecter capable of attaching either round or flat armored cable within standard size round box holes comprising, a sleeve having a contractile portion, connecter anchorage means to fix the sleeve in a box hole, a screw to reduce the contractile portion of the sleeve to secure round cable therein, a separate and removable bearing clamp plate mounted transversely in the contractile portion of the sleeve, said clamp plate being independent of the inner wall of the sleeve, means connecting the plate with the screw by which the plate is forced against a cable, and said plate including an arched upturned closure plate which closes vacant space left in the sleeve by small size cable.

7. An adapting cable connecter to attach round or flat cable within a box hole comprising, a sleeve, connecter anchorage means on the sleeve to fix it in a box hole, cable clamp means to secure round cable in the sleeve, a separate adapter plate cooperating with the sleeve and bridging transversely thereacross to secure flat cable in the sleeve, said adapter plate being independent of the inner wall of the sleeve, said adapter plate provided with a hole therein through which the cable clamp means aforesaid passes, and an upturned edge made on the adapter plate to close the sleeve above the flat plate and to stiffen it against bending strain.

8. A cable connecter ordinarily employed to attach standard size round cable to a box comprising, cooperating half-round split sleeve sections, means thereon to anchor said sleeve within a box hole, clamp screws to render effective the aforesaid means and simultaneously bring together the sleeve sections to clamp large size cable in the sleeve, and a bridging clamp plate adapted to be inserted in the sleeve between the split sections and held in place by the clamp screws to secure small size cable in the sleeve.

9. A cable connecter ordinarily employed to attach standard size round cable to a box comprising, cooperating half-round split sleeve sections, means thereon to anchor said sleeve within a box hole, clamp screws to render effective the aforesaid means and simultaneously bring together the sleeve sections to clamp large size cable in the sleeve, a bridging clamp plate adapted to be inserted in the sleeve between the split sections to secure small size cable in the sleeve, holes in said clamp plate through which the clamp screws pass, one edge of the bridging clamp plate turned down to bear against the cable, and a closure and reinforcement flange turned up on the other side of the bridging clamp plate.

10. A split sleeve cable connecter comprising, a pair of cooperating sleeve sections including box hole edge engaging means on one end thereof by which the connecter is anchored in a box hole, said sections being formed with edges diverging from the box hole edge engaging means by which the other end of the sleeve is permitted to contract, a pair of screws carried at the contracting end of the sleeve, and a cable bearing clamp plate including means at each end of the clamp plate to secure the plate on a screw between the sleeve sections and which reaches inside across the connecter.

11. A cable connecter as defined in claim 10 further characterized by an edge turned down on one side of the plate to bear and bite into the cable, and an edge turned up on the other side of the plate to reinforce said plate and close vacant space in the sleeve.

12. An adapter device for converting ordinary cable connecters from one cable size to another, a flat bearing plate with apertures punched in each end thereof by which the plate is mounted and held in a connecter sleeve, and a cable biting edge turned down on the bearing plate.

13. An adapter device for converting ordinary cable connecters from one cable size to another, a flat bearing plate with apertures punched in each end thereof by which the plate is mounted and held in a connecter sleeve, and a reinforcement and closure flange turned up on the bearing plate.

14. An adapting cable connecter comprising, a sleeve, a plate including adapter and sleeve reducing means and provided with a hole in each end and disposed inside and cross-wise of the sleeve without contacting with the inner wall thereof, a pair of screws mounted in the connecter on diametrically opposite sides of the sleeve each of which passes through the hole in each plate end, and connecter anchorage means carried on the sleeve by which it is fixed in a box hole.

15. An adapting cable connecter comprising, a sleeve, a plate made with a hole in each end and disposed inside and cross-wise of the sleeve without contacting with the inner wall thereof, one edge of the plate turned up at right angles and reaching across the open space in the sleeve, a pair of screws mounted in the connecter on diametrically opposite sides of the sleeve each of which passes through the hole in each plate end, and connecter anchorage means carried on the sleeve by which it is fixed in a box hole.

16. An adapting cable connecter comprising, a sleeve, a plate made with a hole in each end and disposed inside and cross-wise of the sleeve without contacting with the inner wall thereof, one edge of the plate turned down and thus adapted to bite into a cable received into the sleeve, a pair of screws mounted in the connecter on diametrically opposite sides of the sleeve each of which passes through the hole in each plate end, and connecter anchorage means carried on the sleeve by which it is fixed in a box hole.

17. An adapting cable connecter comprising, a sleeve, a plate made with a hole in each end and disposed inside and cross-wise of the sleeve without contacting with the inner wall thereof, the plate being turned up at right angles and reaching across the open space in the sleeve, one edge of the plate turned down and thus adapted to bite into a cable received into the sleeve, a pair of screws mounted in the connecter on diametrically opposite sides of the sleeve each of which passes through the hole in each plate end, and connecter anchorage means carried on the sleeve by which it is fixed in a box hole.

18. An adapting cable connecter for use in connection with split-type sleeve connecters comprising a split member consisting of a pair of sleeve sections, connecter anchorage means by which the sleeve is fixed in a box hole, a pair of ears integral with each section, a screw passed loosely through an ear of one section and screwed into an ear of the other section, and a separable adapter member disposed cross-wise in the sleeve without contacting with the inner wall thereof, between the pairs of ears and held in place by the screws.

19. An adapting connecter comprising, a sleeve having a contractile portion, connecter anchorage means by which it is fixed in a box hole, a cable clamp screw mounted on the sleeve by which the sleeve is contracted and a cable is secured in the sleeve, an adapter plate, means forming part of the sleeve structure by which the adapter plate ends are mounted in the sleeve wall to support the plate at both ends transversely in the sleeve, and the plate including means cooperating with the screw by which the plate is forced against cable received into the sleeve.

20. An adapting connecter comprising, a sleeve ordinarily designed to receive round cable, clamp means to secure the round cable therein, an adapter plate having an arched edge to close space in the sleeve and a flat side to press against small size flat cable, said adapter plate being independent of the inner sleeve wall, and means by which the adapter plate is correlated with the clamp to press against flat cable.

21. A cable connecter comprising cooperating substantially semi-cylindrical sleeve sections having box hole anchorage means at one end, and formed with longitudinal edges diverging from a point proximate the anchorage means, screws connecting the end of the connecter opposite the anchorage means and adapted to contract the same; and a bearing clamp plate including adapting means confined at its ends on the screws, respectively, and extending across the connecter between the sections.

22. A cable connecter comprising cooperating substantially semi-cylindrical sleeve sections having box hole anchorage means at one end and provided with longitudinal edges which diverge from that end, a pair of screws disposed, respectively, upon opposite sides of the other end of the connecter and connecting the sleeve sections and adapted to contract that end, and a bearing clamp plate carried at each end on a screw between the sleeve sections.

In testimony whereof I affix my signature.
GEORGE C. THOMAS, Jr.